US010596589B2

(12) United States Patent
Favero et al.

(10) Patent No.: US 10,596,589 B2
(45) Date of Patent: Mar. 24, 2020

(54) HOLD DOWN DEVICE AND METHOD FOR SECURING MOVABLE VEHICLE PANELS DURING PROCESSING

(71) Applicant: Ford Motor Company, Dearborn, MI (US)

(72) Inventors: Kevin Favero, Plymouth, MI (US); Michael Gardynik, Farmington Hills, MI (US); Daniel Trentin, Ivanhoe (AU); Steven Frank, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 47 days.

(21) Appl. No.: 15/951,368

(22) Filed: Apr. 12, 2018

(65) Prior Publication Data

US 2019/0314854 A1 Oct. 17, 2019

(51) Int. Cl.

*B23P 19/04* (2006.01)
*B05C 13/02* (2006.01)
*B25H 1/00* (2006.01)

(52) U.S. Cl.

CPC ........... *B05C 13/02* (2013.01); *B25H 1/0007* (2013.01)

(58) Field of Classification Search

CPC .... B25B 1/02; B25B 1/04; B25B 3/00; B25B 5/00; B23P 11/00; B23P 19/00; B23P 19/04

See application file for complete search history.

(56) References Cited

U.S. PATENT DOCUMENTS

| | | | | |
|---|---|---|---|---|
| 4,070,010 A * | 1/1978 | Brasca | ...................... | B25B 1/18 269/247 |
| 6,237,905 B1 * | 5/2001 | Halder | ...................... | B25B 5/10 269/24 |
| 8,146,221 B2 * | 4/2012 | Hung | .................... | B25B 27/026 269/24 |
| 9,358,564 B2 | 6/2016 | Deshler | | |
| 2006/0086317 A1 | 4/2006 | Fiedler | | |
| 2010/0044942 A1 * | 2/2010 | Tamai | ..................... | B25B 5/122 269/32 |
| 2014/0035212 A1 * | 2/2014 | Dellach | ................... | B25B 5/122 269/32 |
| 2017/0165826 A1 | 6/2017 | Baskar et al. | | |
| 2019/0314854 A1 * | 10/2019 | Favero | ................. | B25H 1/0007 |

FOREIGN PATENT DOCUMENTS

| | | |
|---|---|---|
| DE | 10323983 | 12/2004 |
| DE | 102010050625 | 5/2012 |
| DE | 102012023768 | 6/2014 |

* cited by examiner

*Primary Examiner* — Lee D Wilson

(74) *Attorney, Agent, or Firm* — Burris Law, PLLC

(57) ABSTRACT

A device for securing a movable panel relative to a vehicle body includes a housing, a plunger, a handle, and a spring. The housing defines a bore and a slot. The plunger includes a shaft and a clamp extending radially outward from the shaft. The shaft extends through the bore and is coupled to the housing for relative axial and rotational movement relative to the housing. The handle is fixedly coupled to the shaft and extends through the slot. The spring biases the clamp toward the housing.

20 Claims, 3 Drawing Sheets

HOLD DOWN DEVICE AND METHOD FOR SECURING MOVABLE VEHICLE PANELS DURING PROCESSING

FIELD

The present disclosure relates to a hold down device and method for securing movable vehicle panels during processing.

BACKGROUND

The statements in this section merely provide background information related to the present disclosure and may not constitute prior art.

During some stages of vehicle manufacture, the movable vehicle panels (e.g., a hood, trunk, or door) are attached to the vehicle body. While the final vehicle typically includes latches attached to the body that secure these movable panels relative to the body, many manufacturing processes can occur after the movable panel is mounted to the body, but before the final latches are installed. Furthermore, some of these manufacturing processes impart forces on the movable panels that can exceed the typical forces expected during consumer use, or can involve chemicals or processes not suitable for the final latches. Thus, the typical production latches for the movable panels can be unsuitable for securing the movable panels during these manufacturing processes. Additionally, some of the processes require the movable panel to be in a position relative to the body that is not the typical resting position of the movable panel of the finished vehicle. For example, during a corrosion inhibitor coating process or a painting coating process, a hood might be held partially open to ensure that all surfaces are appropriately coated. Typically, the temporary securing of the movable panel relative to the body for such processing involves labor intensive fixtures that, in some situations, can damage the movable panel by exerting too much force on the panel or being too rigid.

The teachings of the present disclosure provide for a hold down device and method that solves these problems by securing the movable panel to the vehicle body while providing a force compensating clamping force and being easy to attach and detach from the movable panel.

SUMMARY

In one form, a device for securing a movable panel relative to a vehicle body includes a housing, a plunger, a handle, and a spring. The housing defines a bore and a slot. The plunger includes a shaft and a clamp extending radially outward from the shaft. The shaft extends through the bore and is coupled to the housing for relative axial and rotational movement relative to the housing. The handle is fixedly coupled to the shaft and extends through the slot. The spring biases the clamp toward the housing.

According to a further form, the bore is disposed through a first side of the housing and the housing is open a second side that is opposite the first side.

According to a further form, the spring is disposed within the housing.

According to a further form, the spring is disposed about the shaft.

According to a further form, the device further includes a first spring seat and a second spring seat. The clamp extends radially outward from a first end of the shaft and the first spring seat is coupled to the shaft proximate to a second end of the shaft. The second spring seat is coupled to the housing. The spring engages the first and second spring seats to bias the first spring seat away from the second spring seat.

According to a further form, the first spring seat includes a snap ring received in a circumferential groove disposed about the shaft.

According to a further form, the first spring seat includes a washer disposed between the snap ring and the spring.

According to a further form, the second spring seat defines the bore.

According to a further form, the bore extends through a first end of the housing and the slot extends through a cylindrical side wall of the housing, the side wall being coaxial with the shaft.

According to a further form, the slot includes a first portion and a second portion. The first portion extends longitudinally in a circumferential direction of the side wall. The second portion extends longitudinally from the first portion in an axial direction that is away from the first end of the housing.

According to a further form, the slot includes a third portion extending longitudinally from the first portion in the axial direction away from the first end of the housing. The first portion connects the second and third portions of the slot.

According to a further form, the second portion extends in the circumferential direction and the axial direction.

According to a further form, the device includes a clamp seat fixedly coupled to the housing. The clamp seat extends radially outward from the housing and is aligned with the clamp when the clamp is in a retracted position.

According to a further form, the clamp includes a first prong that extends radially outward from the shaft in a first radially outward direction.

According to a further form, the clamp includes a second prong that extends radially outward from the shaft in a second radially outward direction that is diametrically opposite the first radially outward direction.

In another form, a device for securing a movable panel relative to a vehicle body includes a housing, a plunger, a handle, and a spring. The housing includes a first end wall and a cylindrical side wall. The first end wall defines a bore. The side wall is disposed about an axis and defines a slot. The slot includes a first portion that extends in an axial direction and a second portion that extends in a circumferential direction. The plunger includes a shaft and a clamp member. The shaft is disposed about the axis and extends through the bore for axial and rotational movement relative to the housing. The clamp member extends radially outward from a first end of the shaft. The handle is fixedly coupled to the shaft and extends through the slot. The handle is configured to move the plunger between a retracted position wherein the handle extends through the first portion and an extended position wherein the handle extends through the second portion. The spring is disposed about the shaft and biases the clamp in an axial direction toward the first end wall of the housing.

According to a further form, the device further includes a spring seat disposed within the housing and coupled to a second end of the shaft that is opposite the first end of the shaft. The spring is disposed between the first end wall of the housing and the spring seat.

In another form, a method of securing a movable panel of a vehicle relative to a vehicle body includes providing a fixture. The fixture includes a housing, a plunger, and a spring. The housing is fixed relative to the vehicle body. The housing defines a bore and a slot. The plunger includes a shaft disposed about an axis and a clamp extending radially outward from an end of the shaft. The shaft extends through the bore. The plunger is movable relative to the housing between an extended position and a retracted position. The spring biases the plunger axially toward the retracted position in which the clamp is closer to the housing than when in the extended position. The method includes moving the plunger to the extended position and through an aperture in the movable panel so the shaft extends axially through the aperture and the clamp is disposed on a side of the movable panel that is opposite the housing. The method includes rotating the plunger about the axis relative to the housing. The method includes releasing the plunger and allowing the spring to bias the clamp against the movable panel and toward the housing.

According to a further form, the movable panel is a vehicle hood.

According to a further form, the aperture is defined by a bump stop of the movable panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
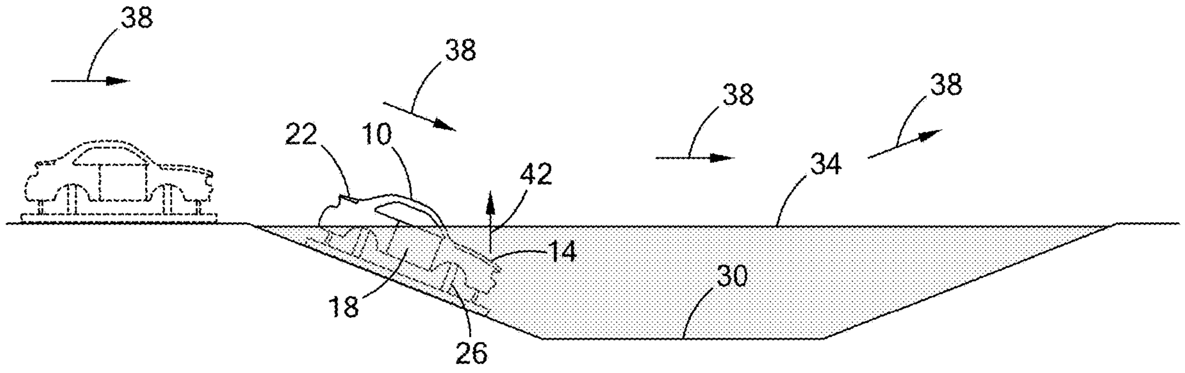
FIG. 1 is a side view of a vehicle body and movable panels mounted to a fixture for undergoing an example manufacturing process.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle body 10, a plurality of movable vehicle panels (e.g., hood 14, door 18, and trunk 22), a fixture 26 and a processing tank 30 are illustrated. While the hood 14, door 18, and trunk 22 are shown in the example provided, the teachings of the present disclosure can apply to other movable vehicle panels. The panels 14, 18, 22 are mounted to the body 10 so that they can move relative to the body (e.g., mounted on one side of the panel to the body via a hinge mechanism, not shown). The fixture 26 is configured to removably attach to the panels 14, 18, 22 and hold the panels 14, 18, 22 in a predetermined position relative to the body 10. In the example provided, the vehicle body 10 is a metal unibody structure, though other configurations can be used. For example, the fixture 26 can be configured to hold movable panels relative to a body and a vehicle frame of a body on frame type vehicle (not shown).

In the example provided, the body 10 and panels 14, 18, 22 undergo a paint coating process by being dunked or moved through the processing tank 30, though the fixture 26 can be used with other manufacturing processes. The processing tank 30 is filled with a liquid 34. In the example provided, the liquid 34 is a paint and the process coats the body 10 and panels 14, 18, 22 with the paint, though other liquids can be used (e.g., a corrosion inhibiting coating). The body 10, panels 14, 18, 22, and fixture 26 are shown in a first position relative to the processing tank 30 in dashed lines in FIG. 1 and are shown in a second position in solid lines. General direction of movement of the vehicle into, through, and out of the processing tank 30 is indicated by arrows 38. In another configuration, not specifically shown, the fixture 26 can be configured to rotate or flip the car in the liquid 34, rather than advancing it through the tank 30.

In the example provided, when the vehicle body 10 enters the processing tank 30, the movement through the liquid 34 produces forces that can act on the movable panels 14, 18, 22 in a direction that would tend to move the panel 14, 18, 22 relative to the body. In the example provided, the liquid 34 can act on the hood 14 to impart an upward force (indicated by arrow 42) on the hood 14. The fixture 26 resists this force and holds the hood 14 generally stationary relative to the body 10 while the vehicle advances through the tank 30.

Figure 2:
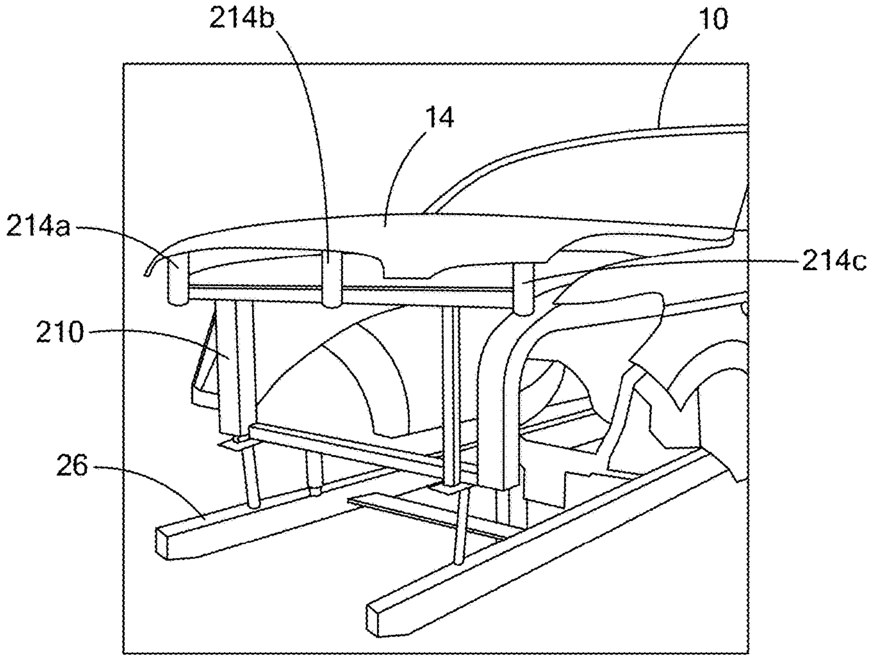
FIG. 2 is a perspective view of the vehicle body, one of the movable panels, and a portion of the fixture of FIG. 1.

With additional reference to FIG. 2, a portion of the vehicle body 10, hood 14, and a portion of the fixture 26 are illustrated in greater detail. In the example provided, the fixture 26 includes a base 210 and at least one panel securing device. In the example provided, the fixture 26 includes three panel securing devices, i.e., one at a first front corner area (i.e., panel securing device 214*a*), one at a center front area (i.e., panel securing device 214*b*), and one at the opposite front corner area (i.e., panel securing device 214*c*), though more or fewer can be used. In one alternative, not specifically shown, the fixture 26 only includes the center panel securing device 214*b*. In another alternative, not specifically shown, the fixture 26 only includes the two end panel securing devices 214*a*, 214*c*. The base 210 is mounted to a track (not shown) which advances the base 210 through the tank 30 (FIG. 1). The body 10 is mounted to the base 210 in a generally rigid, but removable manner (e.g., being bolted or clamped). The panel securing devices 214*a*, 214*b*, 214*c* are configured to removably attach to and hold the hood 14 in a partially open position relative to the body 10.

In the example provided, the panel securing devices 214*a*, 214*b*, 214*c* can be generally similar. Thus, with additional reference to FIGS. 3 and 4, one of the panel securing devices 214*a*, 214*b*, 214*c* (FIG. 2) is illustrated and generally indicated by reference numeral 214. The panel securing device 214 includes a housing 310, a plunger 314, a handle 318, and a spring 322. In the example provided, the panel securing device 214 also includes a snap ring 326 and a washer 330 that form a lower spring seat.

The housing 310 includes a first end wall 338 and a cylindrical side wall 342 that is disposed about an axis 346. The housing 310 can be integrally formed, or the first end wall 338 can be formed separately and mounted to the side wall 342 (e.g., welded, or fastened). The first end wall 338 is disposed at a first axial end of the side wall 342 and defines a bore 354 that is coaxial with the axis 346. The bore 354 has a diameter that is less than the inner diameter of the side wall 342 such that the first end wall 338 extends radially inward of the side wall 342. An inner surface 358 of the side wall 342 and an inner surface 362 of the first end wall 338 define a chamber 366 that is open to the bore 354. In the example provided, the chamber 366 is open through a second axial end of the side wall 342 that is opposite the first end wall 338, though other configurations can be used. In the example provided, the open second axial end can allow the liquid 34 (FIG. 1) to drain from the chamber 366. In another configuration, not shown, a second end wall can be disposed at the second axial end of the side wall 342 to close the chamber 366 at the bottom of the housing 310.

Returning to the example provided, the side wall 342 also defines a slot 374 that is open through the side wall 342 and extends generally in the circumferential direction about the axis 346. The slot 374 has a first slot end 378 and a second slot end 382 and extends between the first and second slot ends 378, 382. In the example provided, the first slot end 378 is rotationally offset from the second slot end 382 by approximately 90° about the axis 346. In the example provided, the slot 374 includes a first leg 386, a second leg 390, and a third leg 394, though other configurations can be used. The first leg 386 extends from the first slot end 378 in the axial direction toward the first end wall 338 to intersect the second leg 390. The second leg 390 extends from the first leg 386 in the circumferential direction about the axis 346 and in the axial direction away from the first end wall 338 until intersecting the third leg 394. The third leg 394 extends from the second leg 390 in the axial direction away from the first end wall 338 to the second slot end 382. In the example provided, the second slot end 382 is further from the first end wall 338 than the first slot end 378, though other configurations can be used. Thus, in the example provided, the first leg 386 is approximately 90° rotationally offset from the third leg 394 and is connected to the third leg 394 by the second leg 390.

The plunger 314 includes a shaft 410 and a clamp 414. The shaft 410 is a cylindrical body disposed coaxially about the axis 346. The shaft 410 includes a lower end 418 and an upper end 422. The lower end 418 is disposed within the chamber 366 and defines a circumferential groove 426 that extends about the circumference of the shaft 410 proximate to the lower end 418 within the chamber 366. The shaft 410 extends from the lower end 418, through the bore 354 to the upper end 422, which is disposed outside of the housing 310. The shaft 410 has a diameter that is less than the bore 354 so that the shaft can rotate and slide axially relative to the housing 310.

The clamp 414 is fixed to the upper end 422 of the shaft 410. The clamp 414 and shaft 410 can be integrally formed, or the clamp 414 can be separately formed and mounted to the shaft (e.g., welded, or fastened). The clamp 414 extends radially outward from the shaft 410. In the example provided, the clamp 414 includes a first finger 430 and a second finger 434 that are symmetrical about the axis 346, though other configurations can be used. In one alternative configuration, not specifically shown, the clamp 414 only includes the first finger 430 and does not include the second finger 434. Returning to the example provided, the fingers 430, 434 each have a width 438 that is approximately equal to the diameter of the shaft 410, a thickness 442 (in the axial direction) that is less than a thickness of a cavity 446 of the hood 14 so that the fingers 430, 434 can enter and rotate within the cavity 446 of the hood 14, and a length 450 (i.e., measured from the axis) that is greater than the radius of the shaft 410 so that the fingers 430, 434 extend radially outward in opposite directions from the shaft 410. In the example provided, the length 450 is greater than the radius of the outer surface of the side wall 342 such that the fingers 430, 434 extend radially outward of the side wall 342, though other configurations can be used. Each finger 430, 434 includes a clamping surface 454, 458 that faces in the axial direction toward the first end wall 338 to oppose the first end wall 338.

The handle 318 extends through the slot 374 so that one end of the handle 318 is fixedly coupled to the shaft 410 proximate to the lower end 418 within the chamber 366 and the other end of the handle 318 extends exterior of the housing 310. In the example provided, the handle 318 is a cylindrical rod that is received in a bore 462 within the shaft 410 between the lower end 418 and the groove 426, though other configurations can be used. The handle 318 can be attached to the shaft 410 in any suitable manner, such as press-fit into the bore 462 or threaded into the bore 462 for example. Alternatively, the handle 318 can be permanently attached to the shaft 410 (e.g., welded).

The spring 322 is disposed within the chamber 366 and configured to bias the plunger 314 in an axial direction such that the clamp 414 is biased toward the housing 310. In the example provided, the spring 322 is a helical coil compression spring, though other types of springs can be used. The spring 322 has a coil diameter that is less than the diameter of the interior surface of the side wall 342 and larger than the diameter of the bore 354. One end 466 of the spring 322 abuts against the inner surface 362 of the first end wall 338.

The snap ring 326 is a "C" shaped member, i.e., a generally annular body with one side of the ring open. The snap ring 326 has an inner diameter that is less than the diameter of the lower end 418 of the shaft 410 and an outer diameter that is less than the diameter of the interior surface of the side wall 342 so that the snap ring 326 fits within the chamber 366 coaxial with the axis 346. The snap ring 326 is formed of a resilient material such that the snap ring 326 can be resiliently deformed to fit over the lower end 418 of the shaft 410 and can resiliently "snap" into the groove 426 to prevent further axial movement of the snap ring 326 relative to the shaft 410.

The washer 330 has an inner diameter that is greater than the diameter of the shaft 410, but less than the diameter of the spring 322, and an outer diameter that is less than the diameter of the interior surface of the side wall 342, but greater than the diameter of the spring 322, so that the washer 330 can move axially within the chamber 366. The inner diameter of the washer 330 is less than the outer diameter of the snap ring 326 and the washer 330 is disposed axially between the spring 322 and the snap ring 326. The other end 468 of the spring 322 abuts one side of the washer 330 and the other side of the washer 330 abuts the snap ring 326 so that the snap ring 326 prevents axial movement of the washer 330 relative to the shaft 410 in one direction. Thus, the inner surface 362 of the first end wall 338 forms an upper spring seat and the washer 330 and snap ring 326 form the lower spring seat, though other configurations can be used.

In one alternative configuration, not shown, the lower spring seat does not include the snap ring 326 and the washer 330 is welded or threaded onto the shaft 410. In another alternative configuration, not shown, the lower spring seat does not include the washer 330 and the snap ring 326 has an outer diameter that is greater than the diameter of the spring 322, such that the end 468 of the spring abuts the snap ring directly. In another configuration, not shown, a washer, similar to the washer 330, can be disposed between the end 466 of the spring 322 and the inner surface 362 of the first end wall 338 to form the upper spring seat.

Thus, the handle 318 can move within the slot 374 to rotate the shaft 410 and the clamp 414 relative to the housing 310, while the spring 322 biases the plunger 314. The handle 318 can move from a first position, wherein the handle 318 is at the first slot end 378, through the first, second, and third legs 386, 390, 394, to a second position, wherein the handle 318 is at the second slot end 382. When the handle 318 is in the first leg 386, the spring 322 biases the handle 318 toward the first position. In the example provided, since the second leg 390 is angled such that the distance between the second leg 390 and the first end wall 338 increases as the second leg 390 approaches the third leg 394, the spring 322 biases the handle 318 toward the second position when the handle is in the second leg 390. When the handle 318 is in the third leg 394, the spring 322 biases the handle toward the second position. In the example provided, moving the handle 318 from the first position to the second position axially translates the shaft 410 and clamp 414, while rotating the shaft 410 and the clamp 414 approximately 90°.

In the example provided, an under side of the hood 14 defines an aperture 474. The aperture 474 can be configured such that when the handle 318 is in the first position (i.e., in the first leg 386 of the slot 374), the fingers 430, 434 of the clamp 414 can be received through the aperture 474, but when the handle 318 is in the second position, the fingers 430, 434 cannot pass through the aperture 474. Thus, the handle 318 can start positioned in the first position in which the plunger 314 is extended relative to the housing 310. The spring 322 biases the handle 318 in the first leg 386 to prevent inadvertent movement and rotation of the plunger 314. The hood 14 can then be moved (e.g., lowered) so that the fingers 430, 434 pass through the aperture and are within the cavity 446. The handle 318 can then be intentionally moved to the second leg 390 and rotated until fully in the second leg 390. Since the clamp 414 is rotated relative to the hood 14 at this position, the fingers 430, 434 are not able to exit the cavity 446 and the spring 322 can then bias the handle 318 toward the second position, which retracts the plunger 314 relative to the housing 310 and causes the clamping surfaces 454,458 to engage an inner surface 478 of the hood 14.

Thus, the clamp 414 engages the inner surface 478 of the hood 14 and holds the hood 14 against the first end wall 338. The spring 322 also provides a resilience that allows small upward movements of the hood 14 as a result of forces from the liquid 34 (FIG. 1), while returning the hood 14 to the first end wall 338. This resilience can reduce deformation of the hood 14 from the forces from the liquid 34 (FIG. 1).

Figure 4:
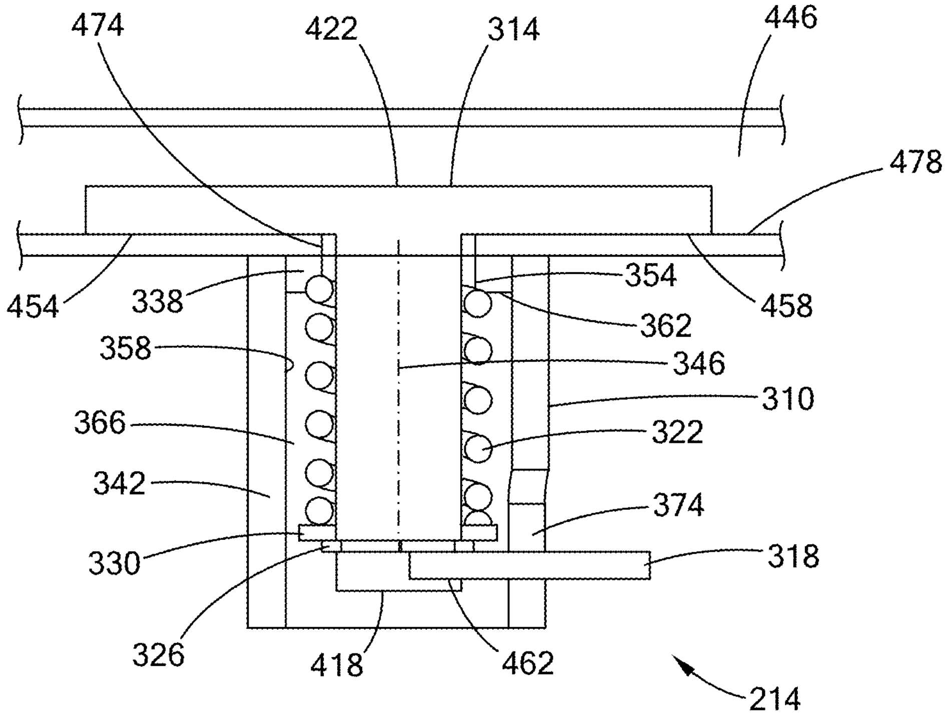
FIG. 4 is a cross-sectional view of the portion of the fixture of FIG. 3, illustrated with a portion of the movable panel of FIG. 2.
Figure 5:
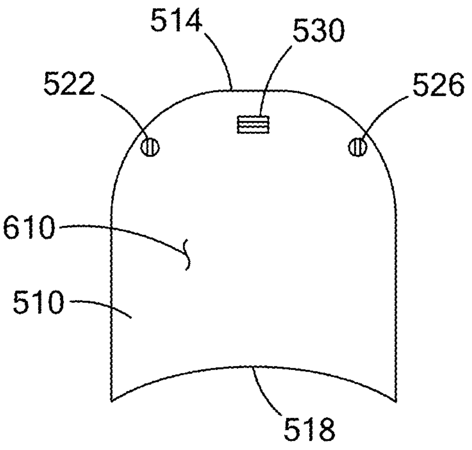
FIG. 5 is a bottom view of a movable panel of a second configuration, illustrating a pair of bump stops and a striker member of the movable panel.

With additional reference to FIG. 5 a hood 510 of second configuration is shown. The hood 510 is similar to the hood 14 (FIGS. 1, 2, and 4), except as otherwise shown or described herein. The hood 510 includes a forward end 514 and rearward end 518, corresponding to the forward and rearward ends of the vehicle body 10 (FIG. 1). The rearward end is hingedly mounted to the vehicle near the windshield area of the vehicle body 10 (FIG. 1). The forward end is proximate to the nose of the vehicle (FIG. 1) and includes a first bump stop 522, a second bump stop 526, and a striker wire 530. The first bump stop 522 is located proximate to a front right corner of the underside of the hood 510. The second bump stop is located proximate to the front left corner of the underside of the hood 510. The striker wire 530 is fixedly attached to the front center of the hood 510 between the first and second bump stops 522, 526.

Figure 6:
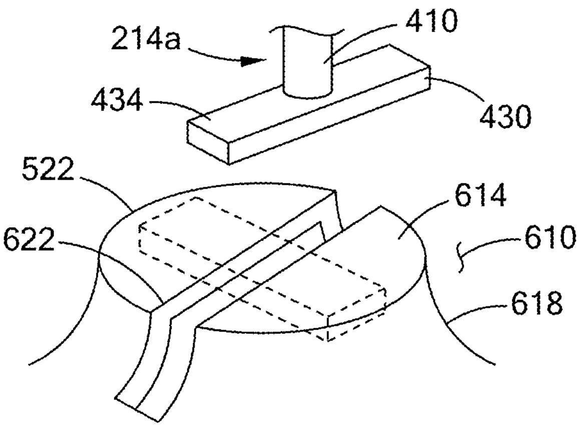
FIG. 6 is a perspective view of one of the bump stops of FIG. 7 and a portion of a fixture of a second configuration.

With additional reference to FIG. 6, the first bump stop 522 is shown in greater detail. The second bump stop 526 is similar to the first bump stop 522. Thus, only the first bump stop is shown and described in detail herein. The first bump stop 522 is raised or extends outward from a bottom surface 610 of the hood 510. The first bump stop 522 includes a plateau 614, a transition portion 618, and an aperture 622. The plateau 614 is offset or raised from the bottom surface 610. The transition portion 618 transitions in a concave manner from the bottom surface 610 to the plateau 614. In the example provided, the plateau 614 is a generally circular surface, though other configurations can be used. In the example provided, the transition portion 618 widens toward the bottom surface 610. The aperture 622 is a generally rectangular shaped slot. In the example provided, the aperture 622 extends across the plateau 614 and a portion of the transition portion 618, though other configurations can be used. In an alternative configuration, not shown, the aperture 622 is entirely defined by the plateau 614 and does not extend into the transition portion 618.

The first bump stop 522 is configured to be held by the panel securing device 214*a*. Similarly, the second bump stop 526 is configured to be held by the panel securing device 214*c*. The fingers 430, 434 of the panel securing device 214*a* are sized such that they can be received through the aperture 622 when aligned with the aperture 622 similar to as discussed above with reference to FIGS. 3 and 4. Accordingly, the fingers 430, 434 are shown in their first position before entering the aperture in solid lines and shown in their second position within the hood 510 in dashed lines. While discussed herein with reference to a hood, other movable panels (e.g., the trunk 22 or door 18, FIG. 1) can include bump stops similar to the first bump stop 522.

Figure 3:
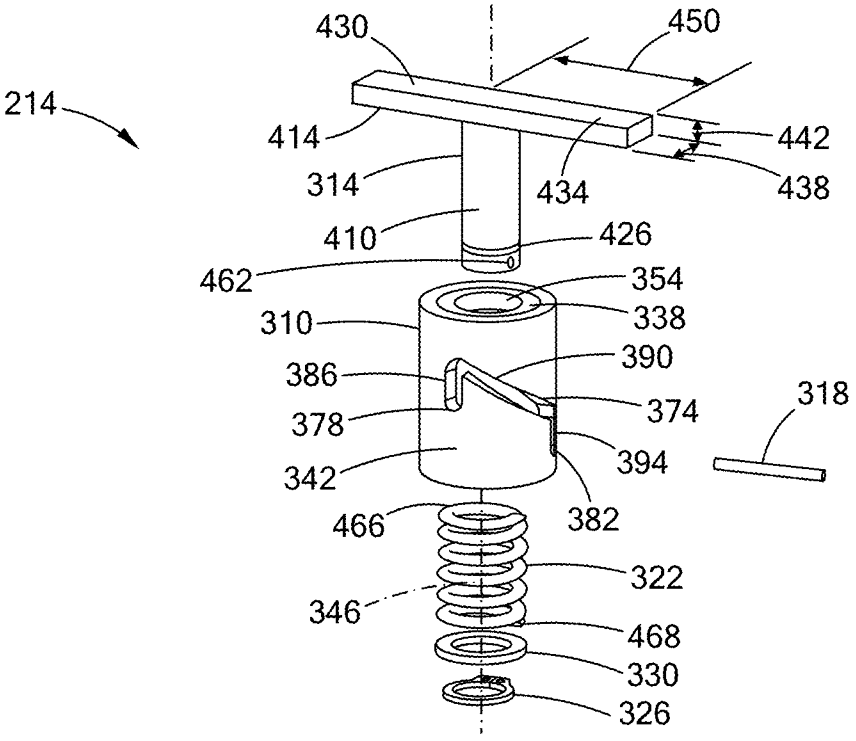
FIG. 3 is an exploded perspective view of a portion of the fixture of FIG. 1.
Figure 7:
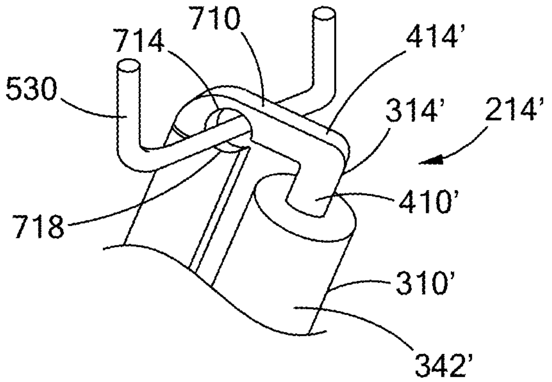
FIG. 7 is a perspective view of the striker member of FIG. 7 and a portion of the fixture of a second configuration.

With additional reference to FIG. 7, the striker wire 530 is shown with a panel securing device 214' of a second configuration. The panel securing device 214' can be similar to the panel securing device 214 (FIGS. 3 and 4), except as otherwise shown or described herein. Accordingly, similar features are denoted with similar, but primed reference numerals and only differences are described in detail herein. In the example provided, the clamp 414' does not include the two fingers 430, 434 (FIGS. 3 and 4). Instead, the clamp 414' includes a single finger 710. The single finger 710 has a proximal end fixedly coupled to the shaft 410 and the finger 710 extends radially outward from the shaft 410 to a distal end of the finger 710 that includes an upper cradle 714. The upper cradle 714 is configured to cradle and hold the striker wire 530 to inhibit the hood 510 from moving upwards relative to the finger 710.

The panel securing device 214' can also include a lower cradle 718. The lower cradle 718 is fixed relative to the housing 310'. The lower cradle 718 is configured to cradle and hold the striker wire 530 to inhibit the hood 510 from moving downwards relative to the housing 310. The lower cradle 718 opposes the upper cradle 714 and the upper cradle 714 can abut the lower cradle 718 when in the plunger 314' is in the retracted or second position. In the example provided, the lower cradle 718 is fixed to the base 210. In another configuration, not shown, the lower cradle 718 is directly attached to the housing 310' and extends radially outward from the housing 310'.

Figure 8:
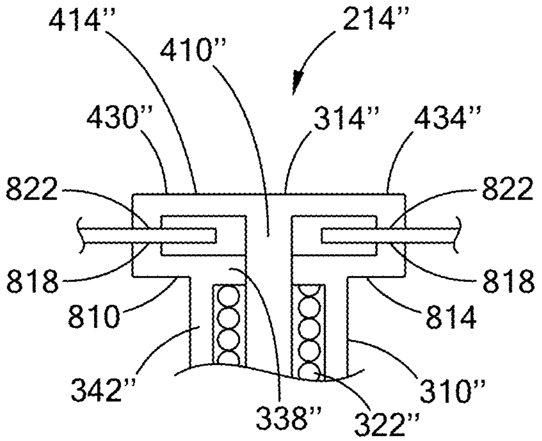
FIG. 8 is a cross-sectional view of a portion of a fixture of a third configuration.

With additional reference to FIG. 8, a portion of a panel securing device 214" of a third configuration is shown. The panel securing device 214" can be similar to the panel securing device 214 (FIGS. 3 and 4), except as otherwise shown or described herein. Accordingly, similar features are denoted with similar, but double primed reference numerals and only differences are described in detail herein. In the example provided, the housing 310" includes a third finger 810 and a fourth finger 814. Proximal ends of the third and fourth fingers 810, 814 are fixedly coupled to the side wall 342" and the third and fourth fingers 810, 814 extend radially outward from diametrically opposite sides of the side wall 342" to their corresponding distal ends. The distal ends of the third and fourth fingers 810, 814 each include a lower clamp body 818 that extends axially upwards beyond the first end wall 338" and generally toward the clamp 414".

The distal ends of the first and second fingers 430, 434 each include an upper clamp body 822 that extends axially downward from the rest of the first or second fingers 430, 434. The lower and upper clamp bodies 818, 822 are positioned radially outward at the same radial distance from the axis 346, so that when the plunger 314" is in the second position (i.e., the retracted position), the hood 14 is gripped between the lower and upper clamp bodies 818, 822. Thus, the contact area of the hood 14 that is gripped is limited to the surface area of the lower and upper clamp bodies 818, 822, which is less than the entire finger 810, 814. Accordingly, the liquid (FIG. 1) can coat more surface area of the hood 14 and the lower clamp bodies 818 provide additional support. While shown with the hood 14, the panel securing device 214" can be used with the hood 510 (FIG. 5) to grip at the bump stops 522, 526 (FIGS. 5 and 6), or other similar movable panels.

Figure 9:
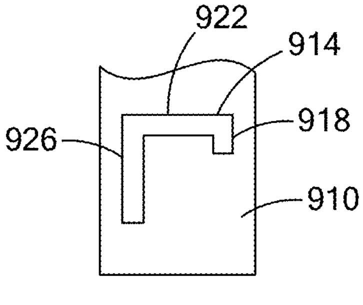
FIG. 9 is a side view of a portion of a fixture of a fourth configuration.

With additional reference to FIG. 9, a portion of a side wall 910 of a different configuration is shown. The side wall 910 is similar to the side wall 342 (FIGS. 3 and 4) and only differences are described in detail herein. The side wall 910 can be used instead of the side wall 342, 342', 342" on any of the panel securing devices 214, 214', 214" (FIGS. 3, 4, 6, 7, and 8). The side wall 910 includes a slot 914, similar to the slot 374 (FIG. 3). The slot 914 includes a first leg 918, a second leg 922, and a third leg 926 that are similar to the first, second, and third legs 386, 390, 394 (FIG. 3), except that the second leg 922 is not angled. In other words, the second leg 922 only extends in the circumferential direction and not in the axial direction.

Figure 10:
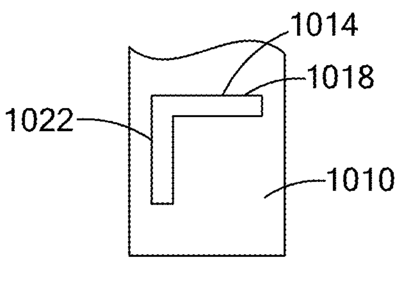
FIG. 10 is a side view of a portion of a fixture of a fifty configuration.

With additional reference to FIG. 10, a portion of a side wall 1010 of another configuration is shown. The side wall 1010 is similar to the side wall 910 (FIG. 9) and only differences are described in detail herein. The side wall 1010 can be used instead of the side wall 342, 342', 342", 910 on any of the panel securing devices 214, 214', 214" (FIGS. 3, 4, 6, 7, and 8). The side wall 1010 includes a slot 1014, similar to the slot 914 (FIG. 9) except that the slot 1014 does not include a leg corresponding to the first leg 918 (FIG. 9). Instead, the slot 1014 includes a first leg 1018 and a second leg 1022. The first leg 1018 is similar to the second leg 922 (FIG. 9). The second leg 1022 is similar to the third leg 926 (FIG. 9). In other words, the first leg 1018 only extends in the circumferential direction and not in the axial direction, while the second leg 1022 only extends in the axial direction. The slots 374, 914, 1014 of FIGS. 3, 9, and 10 are included as examples and other configurations or slot paths can be used, such as slots that have curved paths or differently angled paths for example.

Thus, the teachings of the present disclosure provide for a panel hold down device and method that secures a movable panel to the vehicle body while providing a force compensating clamping force and being easy to attach and detach from the movable panel.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for securing a movable panel relative to a vehicle body, the device comprising:
- a housing defining a bore and a slot;
- a plunger including a shaft and a clamp extending radially outward from the shaft, the shaft extending through the bore and coupled to the housing for relative axial and rotational movement;
- a handle fixedly coupled to the shaft and extending through the slot; and
- a spring biasing the clamp toward the housing.

2. The device of claim 1, wherein the bore is disposed through a first side of the housing and the housing is open a second side that is opposite the first side.

3. The device of claim 1, wherein the spring is disposed within the housing.

4. The device of claim 1, wherein the spring is disposed about the shaft.

5. The device of claim 4, further comprising a first spring seat and a second spring seat, wherein the clamp extends radially outward from a first end of the shaft and the first spring seat is coupled to the shaft proximate to a second end of the shaft, the second spring seat being coupled to the housing, the spring engaging the first and second spring seats to bias the first spring seat away from the second spring seat.

6. The device of claim 5, wherein the first spring seat includes a snap ring received in a circumferential groove disposed about the shaft.

7. The device of claim 6, wherein the first spring seat includes a washer disposed between the snap ring and the spring.

8. The device of claim 5, wherein the second spring seat defines the bore.

9. The device of claim 1, wherein the bore extends through a first end of the housing and the slot extends through a cylindrical side wall of the housing, the side wall being coaxial with the shaft.

10. The device of claim 9, wherein the slot includes a first portion and a second portion, the first portion extending longitudinally in a circumferential direction of the side wall, the second portion extending longitudinally from the first portion in an axial direction that is away from the first end of the housing.

11. The device of claim 10, wherein the slot includes a third portion extending longitudinally from the first portion in the axial direction away from the first end of the housing, the first portion connecting the second and third portions of the slot.

12. The device of claim 10, wherein the second portion extends in the circumferential direction and the axial direction.

13. The device of claim 1, further comprising a clamp seat fixedly coupled to the housing, the clamp seat extending radially outward from the housing and being aligned with the clamp when the clamp is in a retracted position.

14. The device of claim 1, wherein the clamp includes a first prong that extends radially outward from the shaft in a first radially outward direction.

15. The device of claim 14, wherein the clamp includes a second prong that extends radially outward from the shaft in a second radially outward direction that is diametrically opposite the first radially outward direction.

16. A device for securing a movable panel relative to a vehicle body, the device comprising:

a housing including a first end wall and a cylindrical side wall, the first end wall defining a bore, the side wall being disposed about an axis and defining a slot, the slot including a first portion that extends in an axial direction and a second portion that extends in a circumferential direction;

a plunger including a shaft and a clamp member, the shaft being disposed about the axis and extending through the bore for axial and rotational movement relative to the housing, the clamp member extending radially outward from a first end of the shaft;

a handle fixedly coupled to the shaft and extending through the slot and configured to move the plunger between a retracted position wherein the handle extends through the first portion and an extended position wherein the handle extends through the second portion; and a spring disposed about the shaft and biasing the clamp in an axial direction toward the first end wall of the housing.

17. The device of claim 16, further comprising a spring seat disposed within the housing and coupled to a second end of the shaft that is opposite the first end of the shaft, the spring being disposed between the first end wall of the housing and the spring seat.

18. A method of securing a movable panel of a vehicle relative to a vehicle body, the method comprising:

providing a fixture including a housing, a plunger, and a spring, the housing being fixed relative to the vehicle body, the housing defining a bore and a slot, the plunger including a shaft disposed about an axis and a clamp extending radially outward from an end of the shaft, the shaft extending through the bore, the plunger being movable relative to the housing between an extended position and a retracted position, the spring biasing the plunger axially toward the retracted position in which the clamp is closer to the housing than when in the extended position;

moving the plunger to the extended position and through an aperture in the movable panel so the shaft extends axially through the aperture and the clamp is disposed on a side of the movable panel that is opposite the housing;

rotating the plunger about the axis relative to the housing;

releasing the plunger and allowing the spring to bias the clamp against the movable panel and toward the housing.

19. The method of claim 18, wherein the movable panel is a vehicle hood.

20. The method of claim 18, wherein the aperture is defined by a bump stop of the movable panel.

* * * * *